United States Patent Office

3,060,000
Patented Oct. 23, 1962

3,060,000
PRODUCTION OF DEAD BURNED MAGNESIA
Richard P. Snyder, Pittsburgh, Earl Leatham, Wexford, Charles D. Gabor, Verona, and Albert H. Pack, Pittsburgh, Pa., assignors to Harbison-Walker Refractories Company, Pittsburgh, Pa., a corporation of Pennsylvania
No Drawing. Filed Oct. 22, 1959, Ser. No. 847,864
9 Claims. (Cl. 23—201)

This invention relates to the manufacture of dead burned magnesia primarily adapted for use as a refractory material. Particularly it is concerned with the production of refractory magnesia (MgO) grains of very high density, and of high purity, using magnesium hydroxide [Mg(OH)$_2$] as the source material.

The invention is concerned with improvements on the known double burning process which first utilizes a burn of magnesia at intermediate temperatures, and then a much harder final burn. The process of this invention can thus be thought of as having three basic steps: (1) calcining magnesium hydroxide to an intermediate temperature, short of dead-burning, to produce what is termed caustic magnesia, (2) briquetting the thus calcined magnesia, and (3) dead-burning the briquettes. In the main, our invention applies to the first of these two steps, with novel additions to them, although the invention likewise requires control of the dead-burning step, as will be described.

To date the difficulties of operation of such processes have been so great as to render the product expensive to make and of no better properties than to be had by other processes, and thus to exclude it from direct competition with those grades of refractory magnesia which have widespread use. The nature of these prior difficulties, and the steps by which we overcome them will be evident from the following specification.

Refractory magnesia, or dead burned magnesia as it is more commonly known, is one of the principal materials used in the manufacture of basic refractory products. These include what is termed magnesite brick, bonding mortars, ramming and casting mixes, heat exchange elements, and similar products in which the dead burned magnesia is either used alone or is blended with chrome ore and other compatible materials.

Although dead burned magnesia is sometimes produced by burning natural ores of high MgO content, the purer synthetic grades are now more commonly produced by burning magnesium hydroxide to temperatures above 2700° F. This invention applies to dead burned magnesia made in this way.

The magnesium hydroxide is precipitated chemically, collected and thickened from a suspension in water. This water is driven off in the initial burning step at intermediate temperatures.

Magnesium hydroxide is an extremely light and fluffy precipitate that is difficult to handle. The entire process of producing refractory magnesia from this precipitate may be considered to be one of densification or volume reduction. The magnesium hydrate, or hydroxide, collected from thickeners must be reduced to about ⅕ of its thickened volume before it yields the final product, a dead burned grain of magnesia. The initial burn accomplishes much densification merely by driving off the free moisture and much, or substantially all, of the chemically combined water. Briquetting contributes its share, and the remainder is accomplished by dead burning. When sintering agents are used, they have the same purpose.

Depending on what is accomplished in the first burn and in the briquetting steps, the feed to the dead burning kiln is of variable density. With prior processes, particularly those which use water for briquetting, some hydration of the caustic burned magnesia occurs, so that a backward step is taken in the densification process, and the briquettes fed to the dead burning kiln and the product are of low bulk density. This is a vital shortcoming of many prior processes since there is a limit to the amount of densification which can be accomplished in a single burning without actual loss of density. The density-loss results from a cracking of the magnesia briquettes due to excessive shrinkage.

A primary object of this invention is to provide a process of producing dead burned magnesia of high bulk density from magnesium hydroxide that is easily practiced, efficient, and that renders the known type of process alluded to above practical and of real commercial applicability while avoiding its shortcomings.

Another object is to provide a process in accordance with the foregoing object that provides dead burned magnesia of at least about 203 pounds per cubic foot (p.c.f.) and as high as about 218 p.c.f. bulk density and of at least about 95 percent MgO content.

The essence of our process consists in operating every step of the process in such a way that at no stage is there a loss of density. We find that density losses, such as occur in prior processes of this type, as when the caustic burned MgO is hydrated, even slightly, are never wholly recovered. Our process is particularly applicable to the production of dead burned magnesia with purity above 97 percent MgO and of bulk densities of 203 p.c.f. minimum. With magnesia of this purity, or even with purity of the order of 95 percent, the known double burn with briquetting produces dead burned magnesia with porosity no lower than about 14 percent, or in terms of the equivalent bulk density, no higher than 193 p.c.f.

So that it may be more clear how we proceed with our continual densification process, the following material describes it step by step.

*First Burn*

Water removal, partial densification and a high temperature product are the goal in the first burn wherein magnesium hydroxide is converted to calcined magnesium oxide (magnesia). This burn is performed for such time and at such temperatures as will remove all of the free and all, or substantially all, of the chemically combined water, but short of a temperature that will produce dead burned magnesia. At this stage the MgO is hydratable. If samples of calcined magnesia produced by our invention are cooled in a desiccator, it will be found that their ignition loss is generally under 0.1 percent.

A feature of the invention is the use for this first burn of furnaces of the multiple hearth type, e.g., Herreshof furnaces. These multiple shelf calciners receive a charge on the top shelf, and by rabble arms and gravity move it successively downward from one shelf to the last one from which it is discharged. It is normal to operate multiple hearth furnaces with a firing zone limited to the central or intermediate shelves, with the charge being preheated on the higher shelves, and being cooled by incoming air on the lower shelves. Maximum efficiency of fuel utilization dictates that a fairly cool product shall be discharged. This also gives a product which can readily be handled. Contrariwise, an important and critical feature of our invention results from avoidance of this usual cooling zone, and using essentially all of the roaster areas for calcining. Thus we operate to have burners providing heat on one or both of the lower shelves so that the calcined magnesia is hot when discharged.

In the multiple hearth calciners with which we accomplish this first burn, the load temperature reaches 1700° to 2200° F., suitably 1800° F., and can be controlled closely at any chosen temperature within this range.

A unique feature of our operation of the calciner is, as just indicated, that we endeavor to obtain a discharge of the calcined magnesia at a high temperature, above 600° F. to 800° F. and preferably higher, even as high as 2000° F. This is related to the principles which we have found useful in the following briquetting step. Our operation of the multiple shelf roaster with this uniquely hot discharge is at variance with normal procedures.

The product of this step is magnesia densified to an intermediate bulk density.

Following the obvious dictates of fuel conservation the first burn or caclination may be accomplished at least in part with waste heat from the second, or dead, burning step, especially if this latter is accomplished in a rotary kiln. When a vertical kiln is used for the second step, the heat is self utilized for preheating the charge in the upper zone of the kiln.

We believe that it would be possible to so operate or modify other types of calciners so that they might replace the shelf roaster, but similar hot discharge would be essential in practicing our invention.

Preliminary Compression

The problems relative to handling and working with calcined magnesia are so considerable as to have made processes of the double burn type previously impractical. They are due to the fact that it is a light fluffy material which looks much like dry flour but is quite sticky in character. We have found that these problems are alleviated by maintaining the MgO hot up to the dead burning step, and this is a reason for the hot discharge from the hearth calciner. In other words, for the process steps following calcination, including any grinding or mixing, preliminary compressing, briquetting, and the handling from step to step, our invention requires, as essential, maintenance of temperature of the material considerably above room temperatures. From point to point this may require the introduction of additional heat, depending on circumstances. For example, if any additives are combined with the calcined magnesia as sintering agents or for other purposes this may be accomplished in a heated mixer.

Preliminary Compressing

Having to a large extent densified the initial magnesium hydroxide by calcining it, the hot magnesia is moved from the calciner to the next densification step which we refer to as preliminary compressing. In effect it is a compressing step preceding the final briquetting. Subjecting the hot and dry material to double pressing (or to still further repressings) is a means which we have found of obtaining the ultimate degree of densification at this stage of the process.

It is extremely difficult to get the fine, dry and hot magnesia to hold any compressed shape, but we have found that the preliminary compressing can be accomplished if three principles are followed:

(1) The temperature of the magnesia must be kept above 600° F; one means of attaining this goal is the virtual elimination of all surge or holding units, especially if unheated, between the calciner and the compressing means;

(2) We have found that normal briquetting at 2000 to 10,000 psi, is not adequate to give the degree of densification required, and that pressures must be about 20,000 psi, and suitably much higher;

(3) There must be a recycling of compressed material representing a relatively high percentage of the press feed.

The compressed blanks produced in this operation may be made on adapted briquetting presses or rolls, having, for example, complementary corrugations which yield a shaped compress. Almond shaped compresses, for example, measuring 1½x¾x⅝" are of a satisfactory size.

Although the hot, dry MgO is difficult to handle and convey we find that it can be fed readily to the compression means by screw conveyors.

In the beginning the operation of the pre-compression rolls, there may be an extended period of difficulty in which the shapes or blanks fail to hold together. While this tends to correct itself as the rolls becomes heated, we were unsuccessful until we learned that recycling of compressed material was necessary. We find that the necessary minimum amount of this once-pressed material is not less than 15 percent by weight of the feed to the rolls, and that considerably more is helpful. In this way we are able to produce compresses of sufficient strength and density to be fed to the briquetting press.

Briquetting

Whether the briquetting be carried out in one or several stages, the same principles apply as for the pre-compression step insofar as temperatures and pressures are concerned. While much of the work of densification is accomplished in the first step our experience shows that further density increase of as much as 10 to 20 percent is accomplished in repressing. This requires forming pressures above 20,000 psi, maintenance of the compresses at high temperatures, and, surprisingly, the recirculation of compressed materials is still beneficial at this point. Arrangement of recirculation is accomplished by discharging the briquettes onto a screen, from which the fines and scraps together with a portion of the whole briquettes, if desired, are returned to the briquette rolls, or with the compression and briquetting rolls in series, this recirculation may be made to the feed to the compression rolls for reasons of economy. Again we have found that 15 percent by weight is the minimum of returned material for good results.

Briquettes approaching a rounded shape are preferred since this reduces attrition in subsequent handling. Generally we have used molds which produce almond shaped briquettes about 1.5" long, ¾" wide and ⅝" thick due to the problem of mechanical release in the press cavities.

At this stage the process has yielded strong briquettes of high density which, because no water has been added, have suffered no loss of acquired density and require no curing treatment, and which are ready for use as feed material for the dead burning unit.

While it has been mentioned that our process depends on using hot materials throughout, with no access to aqueous agents, the advantages of these self-imposed restrictions may not be evident. We do not fully understand just why there should be such merits in the retention of high temperatures for Preliminary Compression and briquetting, but we have observed repeatedly that only by such means do we secure the hard dense briquettes of high purity magnesia which our process yields.

Regarding the abstention from the use of water, we feel that any degree of hydration which occurs in the caustic magnesia before or after briquetting, will reverse the step-wise densification process, and in a manner which is not always recoverable.

Dead Burning

The dead burning step converts the magnesia into its final stable form which gives it utility as a refractory material. Although the densification proceeds from a briquetted 125 p.c.f. bulk density to about 203 p.c.f. to 218 p.c.f. in this final firing, it is not likely to be a critical step if the briquettes have been prepared in the way we have found to be essential. The fact that the briquettes we feed to the kiln for the final burn have bulk densities of 125 p.c.f. compared to only 112 p.c.f. or less in prior practice is important to the final results.

We have a preference for the use of a vertical kiln for firing, since temperatures of 3500° F. and higher, say 3700° F., are readily attainable. However, our briquettes prepared as described above serve equally well as feed material for rotary kilns, and the temperatures of 3200° F., more or less, which are there attainable, are usually sufficient.

The retention of high temperatures which we have found so essential at the compressing and briquetting operations, has also a marked advantage for feeding the dead burning unit, particularly if this is a rotary kiln. In one aspect, this consists of reducing heat shock which may cause the cracking, bursting or exploding of cold briquettes which are suddenly exposed to high temperatures.

The Product

The dead burned magnesia produced by this process is in the form of extremely dense briquettes of at least 203 p.c.f., and as high as 218 p.c.f., bulk density that are ideally suited for the manufacture of refractories. In fact, the density of dead burned magnesia produced according to this invention is definitely superior to that of ordinary commercial dead burned magnesia. The relative absence of shelliness or lamination presents a marked contrast to briquetted refractory magnesia previously available. The significance is that, upon crushing, there is a minimum of the undesirable flat platey grains which (when mixed with angular grains) obstruct densification in the forming of refractory shapes.

Recapitulation

Our process in summary is concerned with the dead burning of refractory magnesia in a two-step burning process starting with magnesium hydroxide, pre-compressing and briquetting in a special manner between the two burning steps, and maintaining the magnesia at high temperatures throughout the process following the first heating for calcination, and throughout the process while avoiding hydration or curing steps which would cause a retrogression from the continuous densification which is accomplished step-wise throughout the process.

We have described our process in its essentials without reference to the corollary procedures which are frequently followed in the manufacture of dead burned magnesia. Foremost of these is the use of sintering agents, which have been particularly useful in many prior processes which have depended more fully upon the dead burning step for densification than upon the preparation of the high density briquette which we find highly advantageous. It is our experience that if the process steps which we have carefully outlined are carried out in their entirety, the high density kiln feed which is provided will readily be optimally densified by the final firing step without the addition of sintering agents. In most cases it will actually be preferable to avoid their use since, as impurities, they frequently have an undesirable effect on the usefulness of the final product.

However, in some instances the use of sintering agents may be desirable, and our process provides several points at which they may be added. Thus sintering agents (for example iron oxide, silica, boron compounds, zircon, titania, and alumina, in amounts from 0.1 up to 10 percent by weight) may be added to the magnesium hydroxide before calcining, or to the calcined magnesia before it is briquetted. They may also be fed with the briquettes to a rotary kiln for dead burning, or blown into the kiln at the hot or cold end. But obviously such agents applied to formed briquettes have difficulty penetrating the surface skin and therefore do not ordinarily affect the interior magnesia.

Just why a process of continual densification through maintenance of high material temperatures and avoidance of curing and hydration steps should be so advantageous is not wholly understood. We have experimented with various deviations from these procedures, but the general result has been a great increase in process difficulties involving production losses and impairment of properties, especially bulk density, of the dead burned magnesia. However, some departures from the process as described can be tolerated. Thus, it seems to do no considerable harm if the magnesia from the first burn is allowed to cool before briquetting, providing careful precautions are taken to reheat it at least to 1000° F. before briquetting to restore it to its nascent condition. Similarly, the occasional inadvertent shutdown of some of the equipment has taught us that once the high density magnesia briquettes have been made by the processes detailed previously, a brief delay before entering the dead burning kiln, even though cooling to room temperature is involved, is not harmful if wetting or significant hydration is avoided.

Just as we have generally found little need for sintering agents to secure the desired very high density product, our process likewise eliminates the necessity for using bonding agents for the briquettes. Our briquettes, prepared as described, are strongly self-bonding, which is all the more remarkable when considering the prevalent practice which depends upon hydration through adding water or aqueous binders. Without departing from the spirit of our invention, it would of course do no harm to add binders preliminary to briquetting, or in some manner to the briquettes after they are formed, so long as these did not interfere with the attainment of high briquette density, but they are not necessary to the practice of our invention.

Example

Having explained our process, step by step, following is an example of its application.

We started with magnesium hydroxide thickened from a suspension in water, and at this stage having a density of 41 p.c.f. Since the solids are $Mg(OH)_2$ this was equivalent to only 28 p.c.f. of magnesium oxide. The ignition loss of magnesium hydroxide is 31 percent. The purity of this hydrate expressed on an ignition-free basis was 98.4 percent MgO.

We fed the magnesium hydroxide to a multiple shelf calciner (roaster) of the standard type used throughout industry. We fired this calciner with gas as fuel in such a manner as to hold the charge material for an appreciable time at 1800° F., and so that it was discharged from the calciner at about that temperature. A sample of the discharge was cooled in a desiccator and was found to have an ignition loss of 0.08 percent, showing essentially complete conversion to magnesium oxide (magnesia).

The discharged magnesia required no grinding. It was elevated to a pre-compressing unit which consisted of spring pressed, gear driven corrugated rolls. The material showed a temperature of 1320° F. at this point. The load on the springloaded rolls was increased to the point where it was equivalent to 55,000 p.s.i. on the pressure-receiving surfaces. As feeding began, the rolls turned out only a dust, until the recirculation of previously compressed material reached a figure of about 22 percent by weight of the total material charged to the rolls. Then the compresses began to take good form and to show a strength which allowed handling. Their bulk density averaged about 112 p.c.f. and thus represented a high degree of densification, since this is about 112 p.c.f. of MgO.

These compresses consisting of dust and broken pieces approximately ¼ x ¼ x 3″ in size were conveyed by means of a bucket elevator to the briquetting rolls, which were outfitted to produce almond shaped briquettes measuring about 1.5 x ¾ x ⅝″. The feed to the press showed a temperature of 800° F. which proved ample, although in an alternate procedure the compresses were conveyed through a reheating chamber in which their temperature to advantage was increased to 1520° F. With a recirculation of 15 percent by weight of briquettes and pressed scrap to the compression rolls a steady operation was established which turned out well shaped briquettes of excellent density. By using a pressure of 40,000 p.s.i., briquettes were obtained having a density of 125 p.c.f. while maintaining the temperature in both steps.

These briquettes were conveyed to the top of the dead burning kiln which in this instance was a vertical kiln. By screening the briquettes before their entrance to the kiln it was found that breakage was less than 10 percent by weight. Such breakage as existed was recirculated to the compression rolls.

The vertical kiln was operated at a temperature of approximately 3700° F. The briquettes, after about four hours in the kiln, were discharged and found to be shrunken to a bulk density of 209 p.c.f. The time of residence in the firing zone was judged to have been about thirty minutes. We found on firing some of the same briquettes in a periodic kiln that with the longer hold of five hours, a bulk density of 206 p.c.f. was obtained at 2910° F.

According to the provisions of the patent statutes we have explained the principle of our invention and described what we now consider to represent its best embodiment. However, we desire to have it understood that, within the scope of the appended claims, the invention may be practiced otherwise than as specifically described.

We claim:

1. That method of making dead burned magnesia comprising the steps of heating magnesium hydroxide to a temperature sufficient to convert it to caustic magnesia, maintaining the magnesia at said temperature for a time period sufficient to remove all free water and substantially all chemically combined water, passing the resulting caustic magnesia without intervening hydration and at a temperature of at least about 600° F. to means for forming it into small compressed bodies under a pressure of at least 20,000 p.s.i., passing the dry compresses while still heated to at least about 600° F. to means for forming small briquettes under a pressure of at least about 20,000 p.s.i. while recirculating to the compression feed at least about 15 percent by weight of previously compressed material, and then passing the heated briquettes to a furnace and heating them to a temperature to produce dead burned magnesia and thereby producing a product consisting essentially of dead burned magnesia and of at least about 203 p.c.f. bulk density.

2. A method according to claim 1, said hydroxide being heated in a multiple hearth furnace with heat supplied to at least the lower hearths whereby to discharge the caustic magnesia at an elevated temperature.

3. A method according to claim 2, said temperature being from about 1700° to 2200° F.

4. That method of making dead burned magnesia comprising the steps of heating moist magnesium hydroxide to a temperature sufficient to convert it to caustic magnesia having an ignition loss of the order to 0.1%, maintaining the magnesia at said temperature for a time period sufficient to remove all free and substantially all chemically combined water and to obtain a material having an ignition loss of the order to 0.1 percent, without intermediate cooling to ambient temperature passing the dry magnesia at a temperature of at least about 600° F. to means for forming it into small compressed bodies under a pressure of at least 20,000 p.s.i. while recirculating to the heated feed at least about 15 percent by weight of the material that has thus been subjected to compression, passing the dry compresses while still at an elevated temperature to means for forming small briquettes under a perature to means for forming small briquettes under a pressure of at least about 20,000 p.s.i. while recirculating to the briquetting feed at least about 15 percent by weight of briquetted material, and then passing the heated briquettes to a furnace and heating them to a temperature to produce dead burned magnesia and thereby producing a product consisting essentially of dead burned magnesia and of at least about 203 p.c.f. bulk density.

5. That method of making dead burned magnesia comprising the steps of heating moist magnesium hydroxide to a temperature of at least about 1700° F. to convert it to caustic magnesia having an ignition loss of the order of 0.1 percent, maintaining said 1700° F. temperature for a time period sufficient to remove all free water and substantially all chemically combined water to obtain a caustic magnesia having an ignition loss of the order of 0.1%, without intermediate cooling to ambient temperature passing the dry magnesia at a temperature of at least about 600° F. to means for forming it into small compressed bodies under a pressure of at least 20,000 p.s.i. while recirculating to the heated feed at least about 15 percent by weight of the material that has thus been subjected to compression, passing the dry compresses while still heated to means for forming small briquettes under a pressure of at least about 20,000 p.s.i. while recirculating to the briquetting feed at least about 15 percent by weight of briquetted material, and then passing the heated briquettes to a furnace and heating them to at least about 3200° F. to produce dead burned magnesia and thereby producing a product consisting essentially of dead burned magnesia and of at least about 203 p.c.f. bulk density.

6. A method according to claim 5 in which said hydroxide is heated in a multiple hearth furnace with heat supplied to at least the lower hearths whereby the caustic magnesia is discharged at an elevated temperature.

7. A method according to claim 6 in which said briquettes are dead burned in a vertical kiln.

8. That method of making dead burned magnesia comprising the steps of heating moist magnesium hydroxide to a temperature to drive off all free and substantially all chemically combined water to convert it to caustic magnesia, maintaining said temperature for a time period sufficient to drive off all free and substantially all chemically combined water, without intermediate cooling to ambient temperature passing the dry magnesia at a temperature of at least about 600° F. to means for forming it into small compressed bodies under a pressure of at least 20,000 p.s.i. while recirculating to the heated feed at least about 15 percent by weight of the material that has thus been subjected to compression, passing the heated compresses to means for forming small briquettes of about 125 p.c.f. bulk density under a pressure of at least about 20,000 p.s.i. while recirculating to the briquetting feed at least about 15 percent by weight of briquetted material, and then passing the heated briquettes to a furnace and heating them to at least about 3200° F. to produce dead burned magneisa and thereby producing a product consisting essentially of dead burned magnesia and of at least about 203 p.c.f. bulk density.

9. That method of making dead burned magnesia comprising the steps of heating moist magnesium hydroxide in a multiple hearth furnace at least the lower hearth of which are heated at least about 1700° F. to convert it to magnesia from which all of the free and substantially all of the combined water has been removed, maintaining said 1700° F. temperature for a time period sufficient to remove all of the free and substantially all of the chemically combined water from the magnesia, passing the dry magnesia from the said furnace without intermediate cooling below about 600° F. to means for forming it into small compressed bodies under a pressure of at least 20,000 p.s.i. while recirculating to the heated feed at least about 15 percent by weight of the material that has thus been subjected to compression, passing the heated compresses to means for forming small briquettes under a pressure of at least about 20,000 p.s.i. while recirculating to the briquetting feed at least about 15 percent by weight of briquetted material to form briquettes of about 125 p.c.f. bulk density, and then passing the briquettes at about 1000° F. to a vertical kiln and heating them to about 3700° F. to produce dead burned magnesia and thereby producing a product consisting essentially of dead burned magnesia and of at least about 203 p.c.f. bulk density.

References Cited in the file of this patent

UNITED STATES PATENTS

| | | |
|---|---|---|
| 2,335,374 | Woodward | Nov. 30, 1943 |
| 2,348,847 | Pike | May 16, 1944 |
| 2,413,292 | Christensen | Dec. 31, 1946 |
| 2,478,593 | Pike | Aug. 9, 1949 |
| 2,640,759 | Hughey | June 2, 1953 |
| 2,658,814 | Woodward | Nov. 10, 1953 |
| 2,695,242 | Woodward | Nov. 23, 1954 |